(12) United States Patent
Futami et al.

(10) Patent No.: US 6,800,973 B2
(45) Date of Patent: Oct. 5, 2004

(54) STATOR WINDING CONNECTION ARRANGEMENT FOR ELECTRIC MOTOR

(75) Inventors: Toshihiko Futami, Fuji (JP); Yoshiaki Inaba, Fuji (JP); Kiyotaka Kawamura, Numazu (JP)

(73) Assignee: Toshiba Carrier Corporation, Tokyo-to (JP)

( * ) Notice: Subject to any disclaimer, the term of this patent is extended or adjusted under 35 U.S.C. 154(b) by 197 days.

(21) Appl. No.: 10/169,773

(22) PCT Filed: Jan. 12, 2001

(86) PCT No.: PCT/JP01/00114

§ 371 (c)(1),
(2), (4) Date: Jul. 9, 2002

(87) PCT Pub. No.: WO01/52387

PCT Pub. Date: Jul. 19, 2001

(65) Prior Publication Data

US 2003/0020344 A1 Jan. 30, 2003

(30) Foreign Application Priority Data

Jan. 12, 2000 (JP) ........................................ 2000-006279

(51) Int. Cl.$^7$ ............................................... H02K 11/00
(52) U.S. Cl. ........................................................ 310/71
(58) Field of Search .......................... 310/71, 254, 258, 310/259, 260; 336/192

(56) References Cited

U.S. PATENT DOCUMENTS

| | | | |
|---|---|---|---|
| 3,979,615 A | | 9/1976 | Neff .............................. 310/71 |
| 4,287,446 A | | 9/1981 | Lill et al. ...................... 310/71 |
| 4,322,647 A | | 3/1982 | Neroda et al. ................. 310/71 |
| 4,490,636 A | | 12/1984 | McBratney ................... 310/71 |
| 4,557,544 A | * | 12/1985 | Esser .......................... 439/391 |
| 5,739,603 A | * | 4/1998 | Darceot ........................ 310/71 |
| 5,782,652 A | * | 7/1998 | Feher et al. ................. 439/417 |
| 5,828,147 A | | 10/1998 | Best et al. ..................... 310/71 |

FOREIGN PATENT DOCUMENTS

| | | |
|---|---|---|
| DE | 35 37 144 | 4/1987 |
| JP | 11-234942 | 8/1999 |

* cited by examiner

*Primary Examiner*—Dang Le
(74) *Attorney, Agent, or Firm*—Pillsbury Winthrop LLP

(57) ABSTRACT

There is disclosed an electric motor, which contains a plurality of windings wound around a stator core and a plurality of winding terminal receiving portions for containing that include terminal portions of the plurality of windings in a peripheral direction of the stator core at an interval. In addition, the motor includes a terminal plate with lead wires that are drawn out of the plurality of windings along the peripheral direction of the stator core, and connection fittings for electrically connecting the winding terminals to the corresponding lead wires.

12 Claims, 8 Drawing Sheets

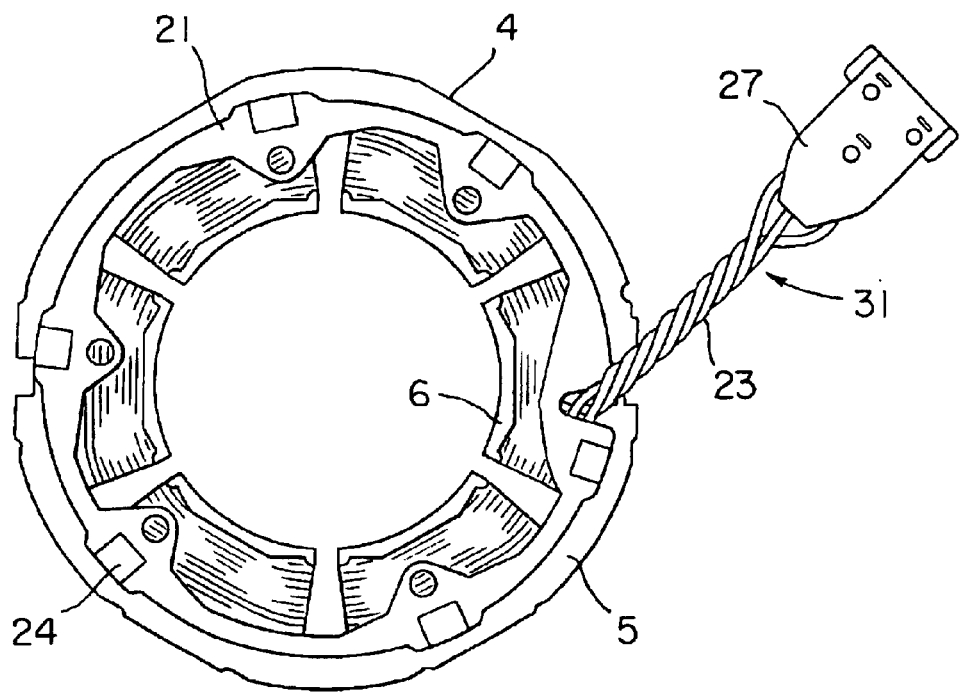
FIG. 8
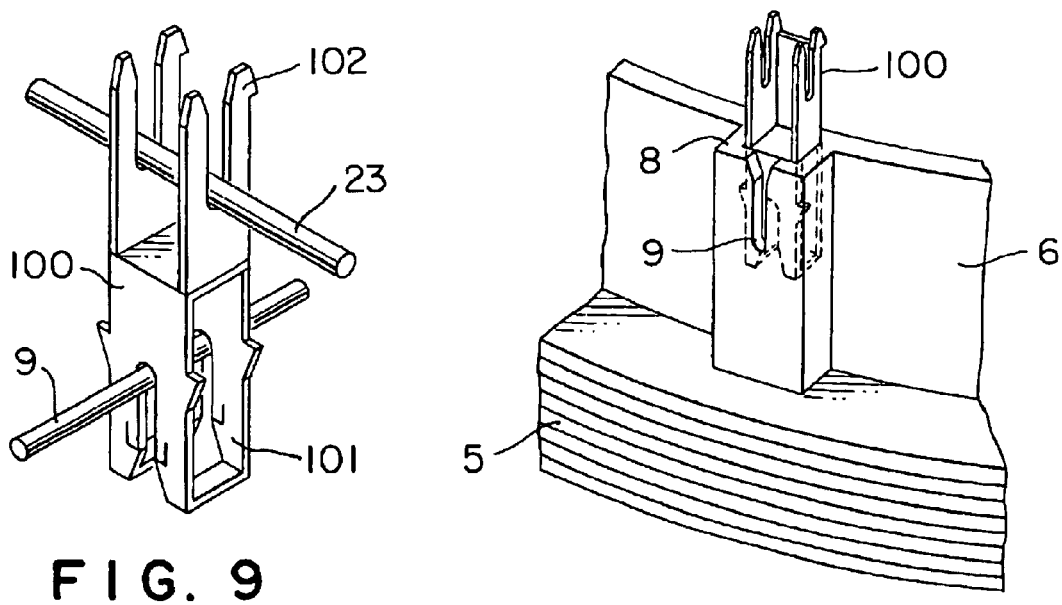
FIG. 9
FIG. 10

STATOR WINDING CONNECTION ARRANGEMENT FOR ELECTRIC MOTOR

BACKGROUND OF THE INVENTION

1. Field of the Invention

The present invention relates to an electric motor incorporated in a compressor or the like mounted on an air conditioner or the like, and more particularly, it relates to an attachment structure of a lead wire drawn out of a stator winding.

2. Background Art

As shown in FIG. 11, an electric motor 1a incorporated in a compressor 1 mounted on an air conditioner or the like is constituted of a rotor 3 fixed to a rotation shaft 2, and a stator 4 disposed on an outer peripheral side of the rotor 3 via a small gap.

A top plan view of the stator 4 is shown in FIG. 12. The stator 4 is constituted of a stator core 5 having a plurality of (six in the drawing) magnetic pole teeth disposed in a peripheral direction at a predetermined interval so as to project toward a central portion (the rotor), and stator windings 7a to 7f wound around the respective magnetic pole teeth of the stator core 5 via insulating members 6. In an end surface portion of the stator core 5, a plurality of winding terminal receiving portions 8a to 8f are disposed integrally with the insulating members 6. These winding terminal receiving portions 8a to 8f are dispersedly disposed on the end surface portion of the stator core 5 in the peripheral direction to accept winding ends of the respective stator windings 7a to 7f closely disposed.

The stator windings 7a to 7f are connected to a power source via a lead wire unit 11. The lead wire unit 11 is constituted of lead wires 13a to 13f, winding side connection fittings 12 (FIG. 13) electrically connected to respective one ends of the wires and attached to the winding terminal receiving portions 8a to 8f, and a power source connector 14 disposed on the other end of the lead wire.

In general, attaching of terminal portions of the respective stator windings to the winding terminal receiving portions 8a to 8f and inserting/fixing of the connection portion 12 can be automated. In the attaching of the lead wire unit 11, however, for example, with a three-phase motor, two for each phase, that is, six winding terminals 9a to 9f in total are present, and six connection fittings 12 and six lead wires 13a to 13f are therefore necessary. Therefore, manufacturing cost of the lead wire unit 11 is raised, further a large number of processes are necessary for attaching the unit, and from this aspect, cost also increases.

Moreover, for the conventional connection fitting 12, while the lead wires 13a to 13f are inserted into lower cutouts of the connection fittings 12 in a radial direction, the connection fitting 12 is pressed downward to break insulation of the lead wire and electrically connect the connection fitting 12 to the lead wire. In this case, the lead wires 13a to 13f turned in the radial directions to be inserted into the connection fittings 12 are led around in the peripheral direction and connected to the power source connector 14, and therefore flexing forces act on the lead wires 13a to 13f in the connection fittings 12. Therefore, when an external force is further applied to the lead wires 13a to 13f and the connection fittings 12, there is a possibility that disconnection and connection defect occur with the lead wire.

In order to avoid the aforementioned disadvantage, as shown in FIG. 14, the flexing force is prevented from acting on the lead wire. Winding terminal receiving portions 16 for a three-phase motor are collectively disposed in one place on the end surface of the stator core 5, the winding terminal is attached in a vertical direction to a connection terminal 15 disposed in the winding terminal receiving portion 16, and further a bifurcated terminal conductor 18a disposed on a terminal plate 17 is pressed from above and inserted into the connection terminal 15 to put the winding terminal between leg portions, so that the winding terminal is electrically connected to the terminal conductor 18a. The other end of the terminal conductor 18a whose one end is vertically inserted into the connection terminal 15 is bent as a terminal conductor 18b at right angles in the terminal plate 17 and extended to the outside in the radial direction. A casing 19 is formed to surround the terminal conductor 18b. The terminal conductor 18b and casing 19 are joined to a winding end side connection portion 11a of the lead wire unit 11 to constitute a connection terminal for electric connection.

A connection structure of FIG. 14 can solve a problem of flexing force exerted on the lead wire in FIGS. 12 and 13, but it is necessary to lead a far detached winding terminal along the insulating member 6 to the winding terminal receiving portion 16. Therefore, a winder structure for performing this operation becomes complicated. Furthermore, in this case, the terminal plate 17 needs to be integrally molded with a terminal 18 by a resin mold, and this is one factor to cause cost increase.

SUMMARY OF THE INVENTION

The present invention has been developed in consideration of the aforementioned circumstances, and an object thereof is to provide a highly reliable motor in which to attach a lead wire unit to the motor, the number of operation processes can be reduced to achieve cost decrease, and further a damage associated with leading of a lead wire does not easily occur.

To achieve the aforementioned object, according to one embodiment of the present invention, there is provided a motor comprising a plurality of windings wound around a stator core; a plurality of winding terminal receiving portions, disposed on an end surface portion of the stator core at an interval in a peripheral direction, for individually receiving a plurality of winding terminal portions; a plurality of first conductive connection fittings, attached to said respective winding terminal receiving portions, for fixing said winding terminal portions to said winding terminal receiving portions and for electrically connecting with said winding terminal portions; a plurality of second conductive connection fittings whose one surface side is provided with a projection for contacting said first connection fitting and whose other surface side is provided with a lead wire which is electrically connected to said winding terminal portion and which extends through the second conductive connection fittings in the peripheral direction of said stator core; and a terminal plate having connection fitting receiving portions to which said plurality of second connection fittings are attached and which are dispersed in the peripheral direction so as to correspond to said plurality of winding terminal receiving portions.

According to another embodiment, there is provided a motor comprising a plurality of windings wound around a stator core; a plurality of winding terminal receiving portions, disposed on an end surface portion of said stator core at an interval in a peripheral direction, for individually receiving a plurality of winding terminal portions; a plurality of connection fittings which fixes said winding terminal portion to said winding terminal receiving portion and which electrically connects with said winding terminal portion on one side, said plurality of connection fittings having a groove through which a lead wire connected to said winding terminal portion passes in the peripheral direction of said stator core on the other side; and a terminal plate having connection fitting receiving portions to which said plurality of connection fittings are attached and which are dispersed in the peripheral direction so as to correspond to said plurality of winding terminal receiving portions; said connection fitting being beforehand attached to either of said winding terminal receiving portion and said terminal plate. According to this embodiment, since the number of materials or the number of components can be reduced, the number of processes and cost can further be reduced.

The winding terminal portion may be drawn in a radial direction of a stator and fixed to the first connection fitting. This can prevent a flexing force from acting on the lead wire in a lead wire connection portion.

The connection fitting may be attached to constitute a pressure contact type terminal for breaking an insulation coat of the winding or the lead wire disposed beforehand for electrically conductive contact. This can simplify an assembly operation.

The terminal plate is provided with a guide groove for guiding the lead wire, and this guide groove may have a width substantially equivalent to a diameter of the lead wire, and also have a depth such that a plurality of lead wires can be superposed and accommodated. This can prevent the lead wires from jumping out or crossing one another when the wires are led around.

BRIEF DESCRIPTION OF THE DRAWINGS

FIG. 8 is a diagram showing that the terminal plate of FIG. 5 is attached to the stator of FIG. 1, FIG. 9 is a perspective view of a connection fitting according to a second embodiment of the present invention, FIG. 10 is a perspective view showing that the connection fitting of FIG. 9 is inserted into the winding terminal receiving portion.

DESCRIPTION OF THE PREFERRED EMBODIMENTS

An embodiment of the present invention will be described hereinafter in detail with reference to the drawings.

Figure 1:
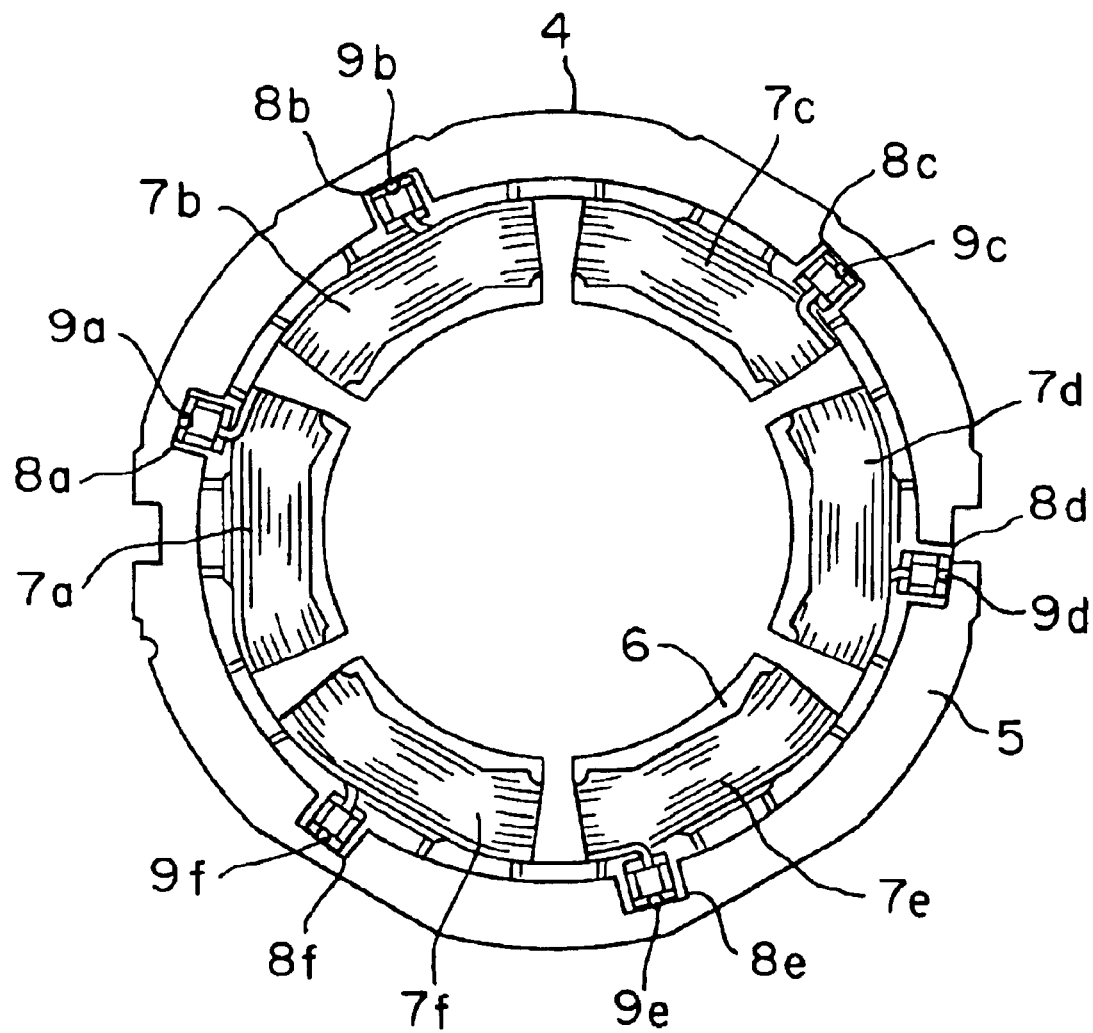
FIG. 1 is a top plan view of a stator according to a first embodiment of the present invention.
Figure 11:
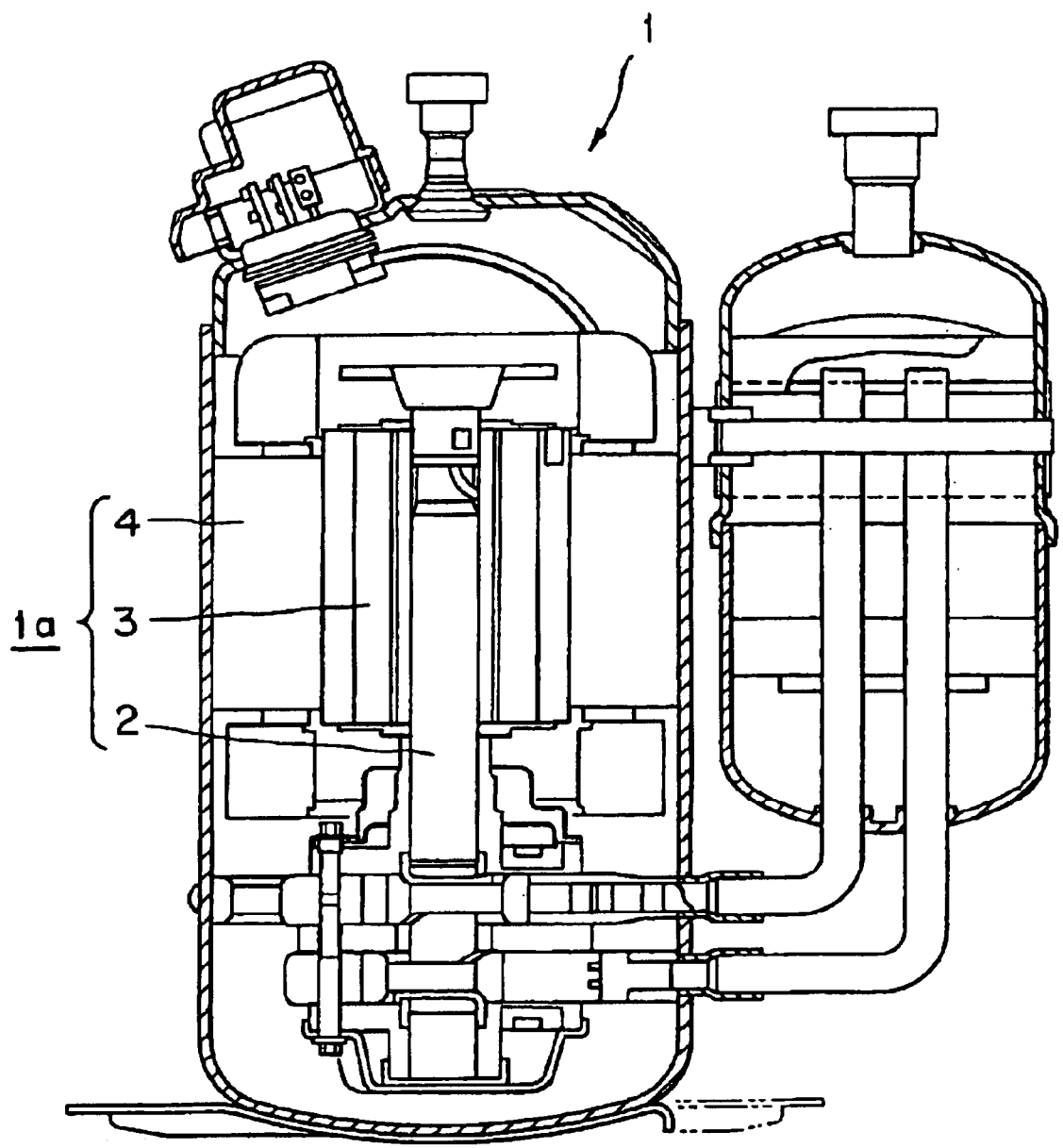
FIG. 11 is a schematic sectional view of a known compressor to which the present invention is applied.
Figure 12:
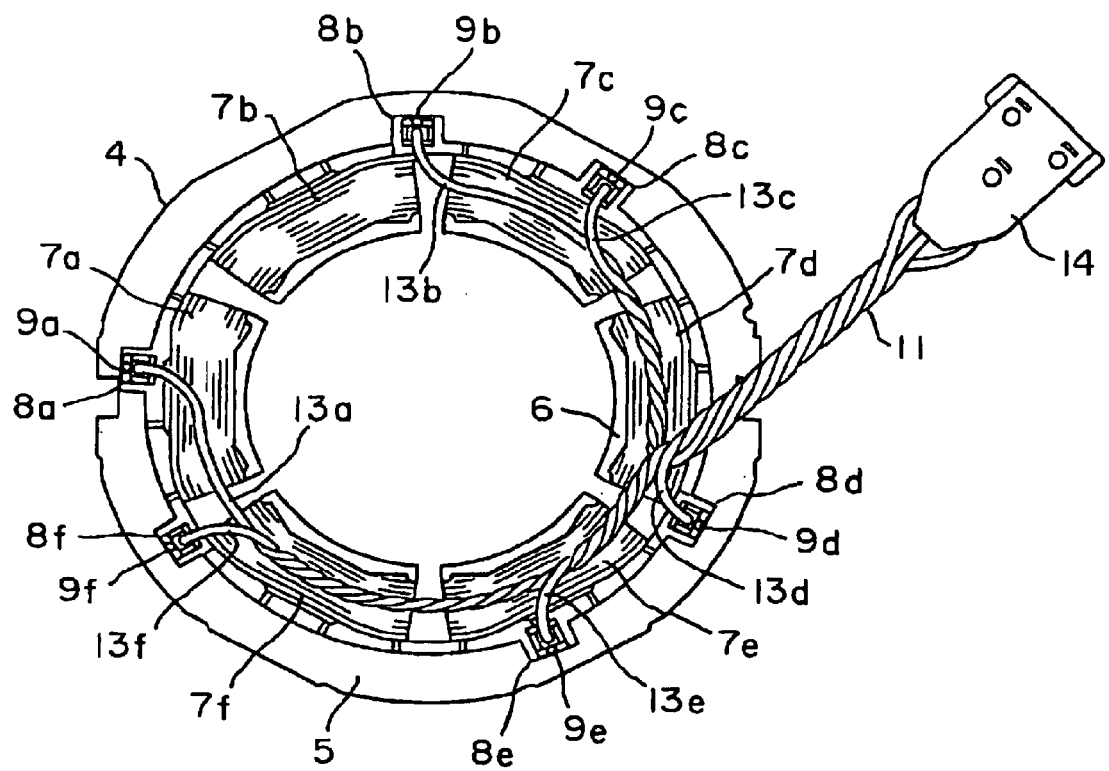
FIG. 12 is a top plan view of a conventional motor stator.
Figure 13:
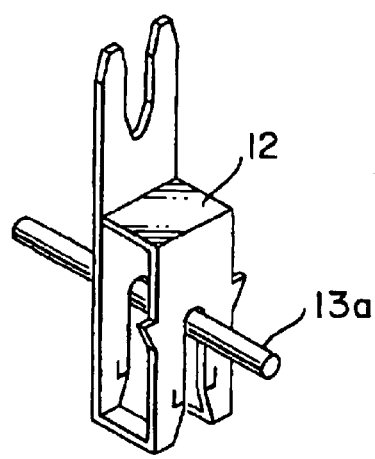
FIG. 13 is a perspective view of the connection fitting in FIG. 12.
Figure 14:
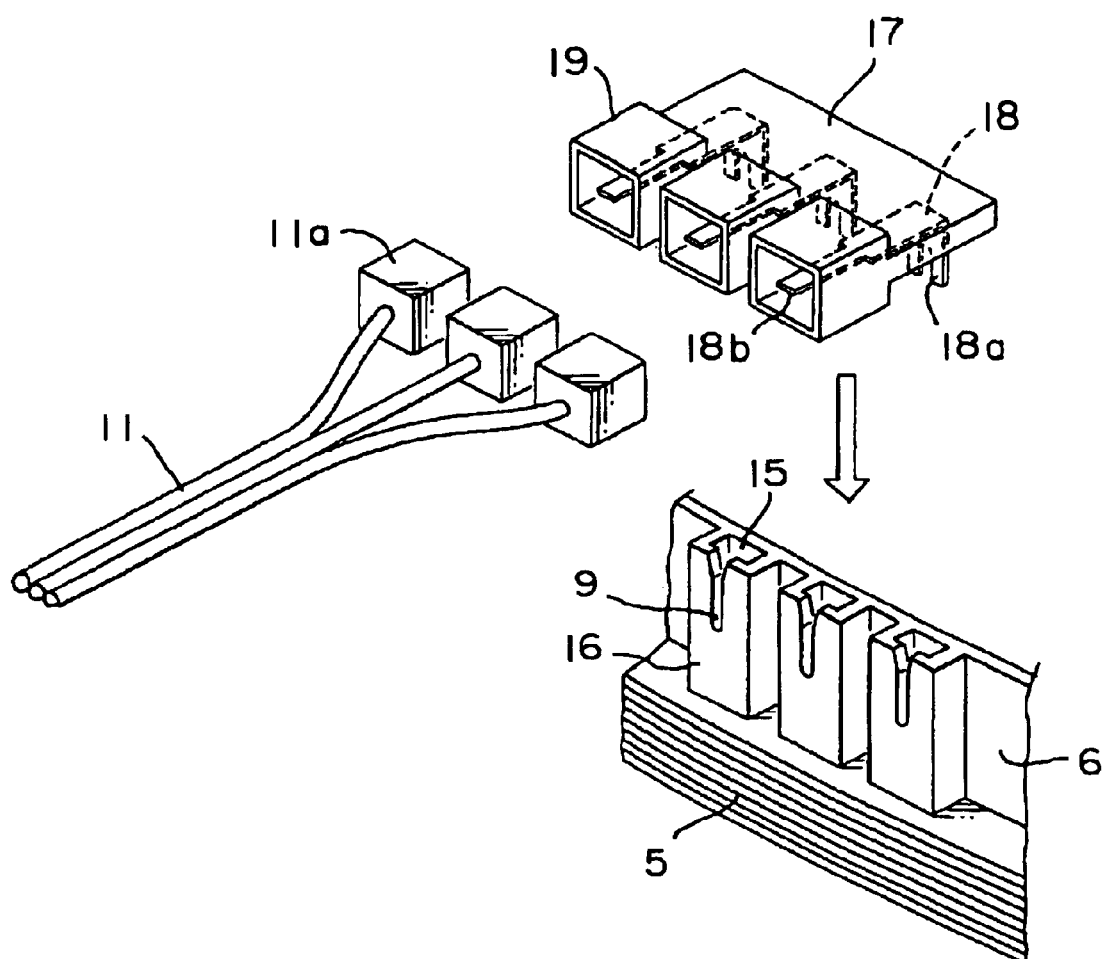
FIG. 14 is an explanatory view showing a conventional lead wire attachment structure in which winding terminal receiving portions are collectively disposed.

FIG. 1 shows a first embodiment of an electric motor according to the present invention. This embodiment relates to a stator 4 of a motor 1a incorporated in a compressor 1 mounted on an air conditioner as shown in FIG. 11.

As shown in FIG. 1, the stator 4 is constituted of a stator core 5 having a plurality of (six in a shown case) magnetic pole teeth disposed in a peripheral direction with a predetermined interval to jut out toward a central portion (rotor), and stator windings 7a to 7f wound around the respective magnetic pole teeth of the stator core 5 via insulating members 6. In a top end surface portion of the stator core 5, a plurality of winding terminal receiving portions 8a to 8f are disposed integrally with the insulating members 6. These winding terminal receiving portions 8a to 8f are dispersed and disposed on the end surface portion of the stator core 5 in the peripheral direction to accept winding ends of the respective stator windings 7a to 7f disposed in the vicinity.

The winding 7a and the winding 7d positioned opposite to the winding are continuously wound around to constitute a first phase winding, similarly the windings 7b and 7e are continuously wound around to constitute a second phase winding, and further the windings 7c and 7f are continuously wound around to constitute a third phase winding. A winding terminal 9a drawn from the winding 7a is attached as a winding start end of the first phase winding to the winding terminal receiving portion 8a, and a winding terminal 9d drawn from the winding 7d is attached as a winding finish end of the first phase winding to the winding terminal receiving portion 8d. Similarly, a winding terminal 9c drawn from the winding 7c is attached as a winding start end of the second phase winding to the winding terminal receiving portion 8c, and a winding terminal 9f drawn from the winding 7f is attached as a winding finish end of the second phase winding to the winding terminal receiving portion 8f. Furthermore, a winding terminal 9e drawn from the winding 7e is attached as a winding start end of the third phase winding to the winding terminal receiving portion 8e, and a winding terminal 9b drawn from the winding 7b is attached as a winding finish end of the third phase winding to the winding terminal receiving portion 8b. The stator windings 7a and 7d, 7b and 7e, and 7c and 7f in positions mechanically deviating from each other by 180° are continuously wound around, and portions corresponding to middles are connected in common to form a three-phase system neutral point. After attaching the winding terminals 9a to 9f to the respective winding terminal receiving portions 8a to 8f, a conductive first connection fitting 10 for fixing the winding terminal (see FIGS. 2, 3) is inserted thereinto.

Figure 2:
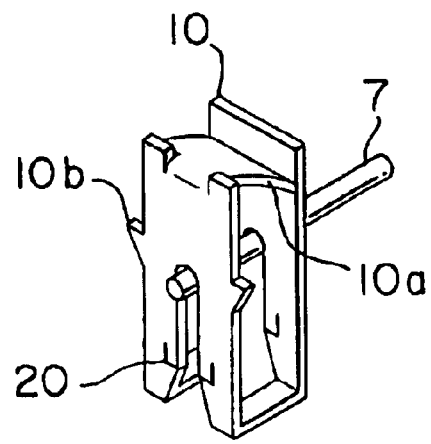
FIG. 2 is a perspective view showing a first connection fitting in FIG. 1.

As shown in FIG. 2, for the first connection fitting 10, one flat metal plate is bent substantially in a U shape and processed to obtain a size such that the fitting can be inserted into the winding terminal receiving portions 8a to 8f, and a cutout 20 slightly narrower than a diameter of the stator windings 7a to 7f (hereinafter referred to as the winding 10) is formed along a height from a bottom to a middle of the U-shaped metal plate. One tip end portion of the U-shaped metal plate is turned back toward the other tip end portion to form an engaging piece 10a for engaging with a lead wire unit connection terminal described later, and a plurality of projections 10b for engaging with inner walls of the winding terminal receiving portions 8a to 8f are formed in a side surface of the plate.

Figure 3:
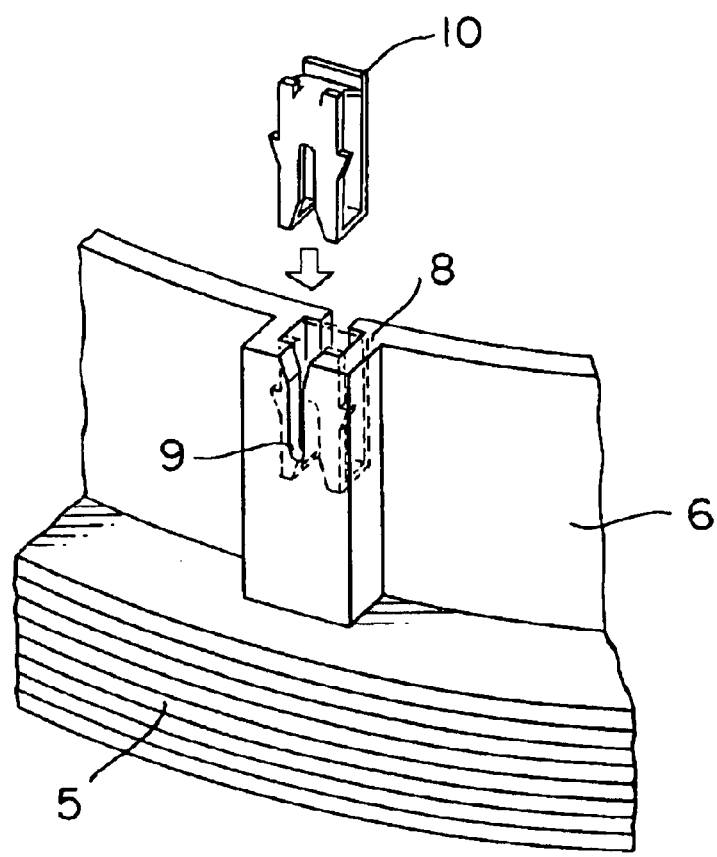
FIG. 3 is an enlarged perspective view of a winding terminal receiving portion in FIG. 1.

As shown in FIG. 3, after inserting a winding terminal 9 (generic numeral of 9a to 9f) into a winding terminal receiving portion 8 (generic numeral of 8a to 8f) to the outside from the inside, and by inserting the first connection fitting 10 into the winding terminal receiving portion 8 in such a manner that the cutout, that is, groove 20 holds the winding terminal, the groove 20 breaks a winding insulating coating film, and the first connection fitting 10 is electrically and mechanically connected to the winding terminal 9. This connection system is known as a "pressure contact type terminal".

Figure 4:
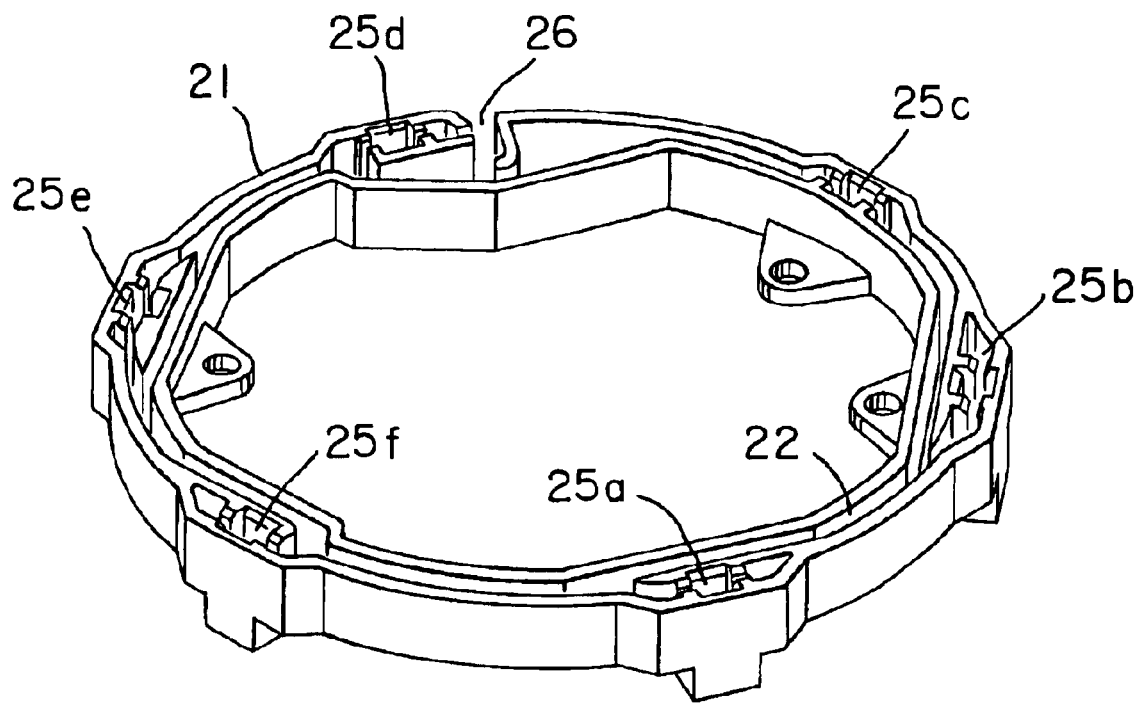
FIG. 4 is a perspective view of a terminal plate to be assembled with a stator of FIG. 1.
Figure 5:
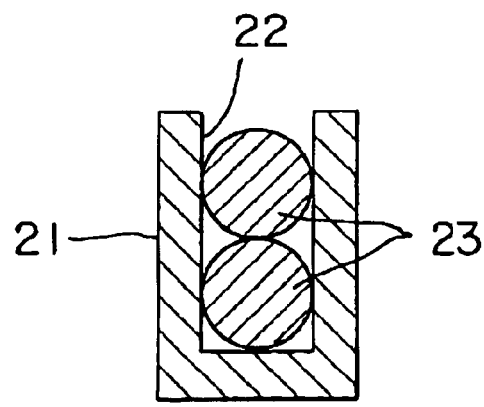
FIG. 5 is a sectional view of the terminal plate of FIG. 4.

A terminal plate 21 disposed on the top end surface of the stator core 5 will next be described. As shown in FIG. 4, the terminal plate 21 is formed in an annular shape to be held in the top end surface of the stator core 5, and is provided with a guide groove 22 for leading a lead wire around in the peripheral direction of the stator 4. A width of the guide groove 22 is set to be substantially equal to a diameter of a lead wire 23 (see FIG. 5). A depth of the guide groove 22 is set to be twice or more as large as the diameter of the lead wire such that two or more lead wires 23 are superposed and accommodated as shown in FIG. 5. During leading around of the lead wire 23, the lead wire 23 is pushed into the guide groove 22 and led around along the guide groove 22. Thereby, the lead wire 23 is fixed, and an operation of leading around the lead wire is facilitated.

In the terminal plate 21, connection fitting receiving portions 25a to 25f for containing a second conductive connection metal 24 (see FIG. 7) along the guide groove 22 are disposed on an outer peripheral side of the terminal plate 21 and dispersed in the peripheral direction. When the terminal plate 21 is disposed in the stator, the receiving portions 25a to 25f are disposed in positions opposite to the winding terminal receiving portions 8a to 8f (see FIG. 1) formed and disposed integrally with the insulating member 6 on the end surface of the stator core 5.

Figure 6:
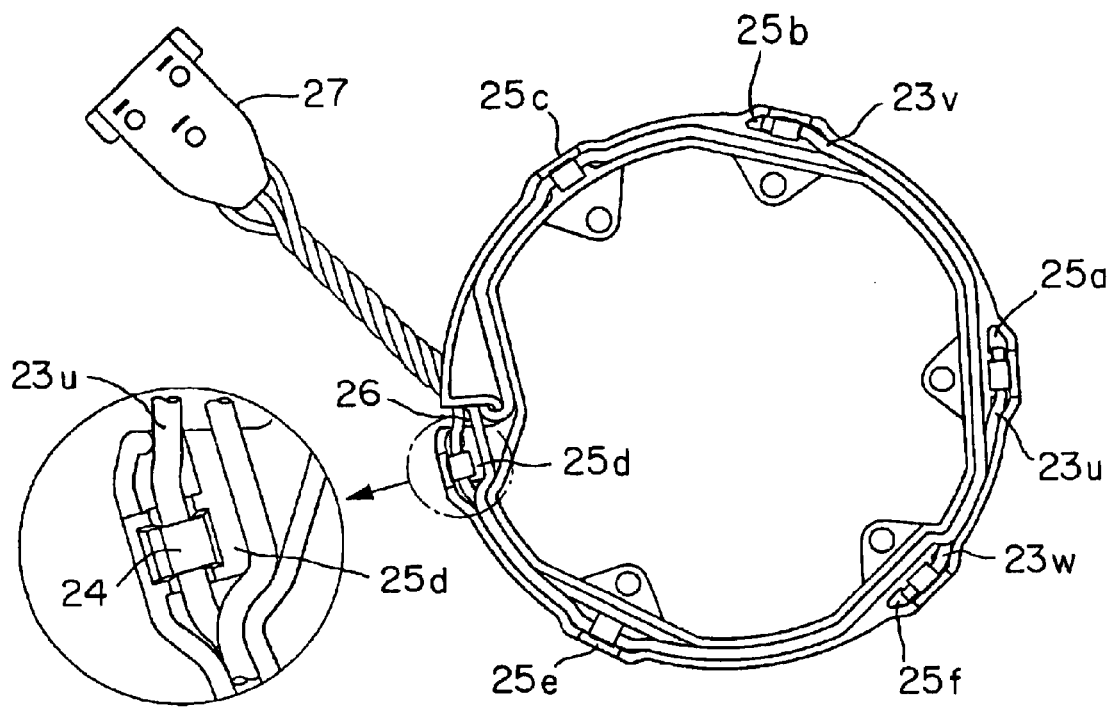
FIG. 6 is a diagram showing that a lead wire unit is attached to the terminal plate of FIG. 4.
Figure 7:
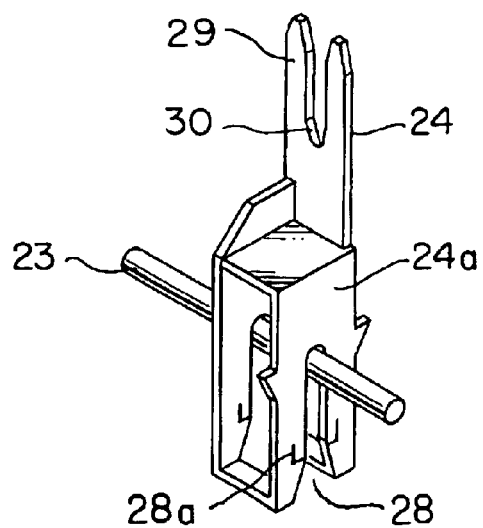
FIG. 7 is a perspective view of a second connection fitting to be assembled with the stator of FIG. 1.

For a first phase lead wire 23u attached to the terminal plate 21, as shown in FIG. 6, one terminal thereof is inserted and disposed into the lead wire connection fitting receiving portion 25a from the peripheral direction, and subsequently a terminal plate side engagement portion 24a of the second connection fitting 24 shown in FIG. 7 is inserted from above and fixed. After leading the lead wire 23u substantially around the half of a periphery along the guide groove 22 (see FIG. 4, 5) from the connection fitting receiving portion 25a, the lead wire 23u is passed through the connection fitting receiving portion 25d positioned opposite to the connection fitting receiving portion 25a, and the terminal plate side engagement portion 24a of the second connection fitting 24 is inserted into the connection fitting receiving portion 25d to fix the lead wire 23u. After the lead wire 23u is further drawn out of a lead wire exit 26, the other terminal portion of the wire is connected to a power source connector 27.

Similarly, for a lead wire 23v, one terminal thereof is disposed in the connection fitting receiving portion 25b, and the terminal plate side engagement portion 24a of the second connection fitting 24 is inserted into the connection fitting receiving portion 25b to engage with the terminal of the lead wire 23v, and fixed. After leading the lead wire 23v substantially around the half of the periphery along the guide groove 22 from the connection fitting receiving portion 25b, the lead wire 23v is passed through the connection fitting receiving portion 25e positioned opposite to the connection fitting receiving portion 25b, and the terminal plate side engagement portion 24a of the second connection fitting 24 is inserted into the connection fitting receiving portion 25e. After the lead wire 23v is drawn out of the lead wire exit 26, the other lead wire terminal is connected to the power source connector 27.

Also for a lead wire 23w, one terminal thereof is disposed in the connection fitting receiving portion 25f, and the terminal plate side engagement portion 24a of the second connection fitting 24 is inserted into the connection fitting receiving portion 25f to engage with the terminal of the lead wire 23w, and fixed. Moreover, after leading the lead wire 23w substantially around the half of the periphery along the guide groove 22 from the connection fitting receiving portion 25f, the lead wire 23w is passed through the connection fitting receiving portion 25c positioned opposite to the connection fitting receiving portion 25f, and the terminal plate side engagement portion 24a of the second connection fitting 24 is inserted into the connection fitting receiving portion 25c. After the lead wire is drawn out of the lead wire exit 26, the other terminal of the lead wire 23w is connected to the power source connector 27. The lead wires 23u, 23v, 23w drawn out of the lead wire exit 26 are twined into one bunch and connected to the power source connector 27.

Additionally, the second connection fitting 24 shown in FIG. 7 is provided with the terminal plate side engagement portion 24a formed by folding back one end of one metal plate in a rectangular parallelepiped shape to obtain a size such that the portion can be inserted into the lead wire receiving portion 25a. Moreover, in order to electrically connect the terminal plate side engagement portion 24a to the lead wires 23u, 23v, 23w, the portion is provided with a groove portion 28 whose entrance is formed in a tapered shape, and a click 28a for preventing the lead wire from dropping is disposed for the groove portion 28 in the vicinity of the entrance of the groove portion 28. Furthermore, for the second connection fitting 24, the other end of the metal plate is used to form a terminal conductor 29 jutting out in a fork shape, which is inserted into the first connection fitting 10 inserted in the winding terminal receiving portions 8a to 8f to constitute the connection fitting. The terminal conductor 29 is provided with a groove portion 30 for passing the winding terminals 9a to 9f therethrough when the conductor is inserted into the first connection fitting 10. Additionally, the groove portions 28 and 30 are designed to be in an orthogonal relation such that the lead wire 23 crosses at right angles to the winding terminals 9a to 9f.

The terminal plate 21 assembled by the aforementioned constitution is disposed on the end surface of the stator core 5 as shown in FIG. 8 by aligning the second connection fitting 24 with the first connection fitting 10, and six projections 29 of the second connection fitting 24 attached to the terminal plate 21 are simultaneously inserted into the engaging pieces 10a of the first connection fittings 10, so that the winding terminals 9a to 9f are connected to the lead wires 23u, 23v, 23w.

The second connection fitting 24 inserted in the lead wire receiving portion 25a in this manner is connected to the first connection fitting 10 inserted in the winding terminal receiving portion 8a, the second connection fitting 24 inserted in the lead wire receiving portion 25d is connected to the first connection fitting 10 inserted in the winding terminal receiving portion 8d, the second connection fitting 24 inserted in the lead wire receiving portion 25b is connected to the first connection fitting 10 inserted in the winding terminal receiving portion 8b, the second connection fitting 24 inserted in the lead wire receiving portion 25e is connected to the first connection fitting 10 inserted in the winding terminal receiving portion 8e, the second connection fitting 24 inserted in the lead wire receiving portion 25f is connected to the first connection fitting 10 inserted in the winding terminal receiving portion 8f, and the second connection fitting 24 inserted in the lead wire receiving portion 25c is connected to the first connection fitting 10 inserted in the winding terminal receiving portion 8c. That is to say, the lead wire 23u is connected to the winding terminals 9a and 9d drawn out of the stator windings 7a and 7d, the lead wire 23v is connected to the winding terminals 9b and 9e drawn out of the windings 7b and 7e, and the lead wire 23w is connected to the winding terminals 9c and 9f drawn out of the windings 7c and 7f.

Additionally, in FIG. 8, the power source connector 27, and lead wire 23 formed of the lead wires 23u, 23v, 23w constitute a lead wire unit 31.

According to the aforementioned first embodiment, since the terminal plate 21 is disposed on the stator to complete the connection of the winding terminal to the lead wire, an attaching process can be simplified. Moreover, since the lead wire is led around in the peripheral direction of the stator, there is no flexing of the lead wire in the connection fitting, and wiring can be led around without any tensile force. Furthermore, since the terminal plate 21 is provided with the guide groove 22, a lead-out wire is fixedly disposed, the leading-around operation can securely and easily be performed, and the wiring can be prevented from jumping out or crossing.

A second embodiment of the motor of the present invention will next be described.

In the second embodiment shown in FIG. 9, a connection fitting 100 is used in which a connection fitting 101 to be connected to the winding terminal 9 is integrally molded with a connection fitting 102 to be connected to the lead wire 23. First, the winding terminal 9 is disposed in the winding terminal receiving portion 8, and subsequently, the connection fitting 100 is inserted/attached into the winding terminal receiving portion 8 as shown in FIG. 10. This fixes the winding terminal 9 to the winding terminal receiving portion 8, and additionally electrically connects the connection fitting 102 to the winding terminal 9. Moreover, the terminal plate 21 in which the lead wire 23 is led around along the guide groove 22 is disposed on the end surface of the stator core 5 with the connection fitting 100 attached thereto, and a plurality of connection fittings 100 are simultaneously inserted and attached into lead wire receiving portions 25 of the terminal plate 21. This realizes electric connection of the lead wire 23 to the connection fitting 100. Thereby, the electric connection of the stator windings 7a to 7f to the lead wire 23 is completed.

According to the aforementioned second embodiment, an operation (six processes) of inserting the lead wire side connection fittings into the terminal plate becomes unnecessary, the number of processes decreases, and the operation is further simplified as compared with the first embodiment.

What is claimed is:

1. An electric motor comprising:
   a plurality of windings wound around a stator core;
   a plurality of winding terminal receiving portions, disposed on an end surface portion of the stator core at an interval in a peripheral direction, for individually receiving a plurality of winding terminal portions;
   a plurality of first conductive connection fittings, attached to said respective winding terminal receiving portions, for fixing said winding terminal portions to said winding terminal receiving portions and for electrically connecting with said winding terminal portions;
   a plurality of second conductive connection fittings whose one surface side is provided with a projection for contacting said first connection fitting and whose other surface side is provided with a lead wire which is electrically connected to said winding terminal portion and which extends through the second conductive connection fittings in the peripheral direction of said stator core; and
   a terminal plate having connection fitting receiving portions to which said plurality of second connection fittings are attached and which are dispersed in the peripheral direction so as to correspond to said plurality of winding terminal receiving portions.

2. The motor according to claim 1 wherein said winding terminal portion is drawn out in a radial direction of said stator and fixed to said first connection fitting.

3. The motor according to claim 1 wherein said first connection fitting is constituted as a pressure contact type terminal in which a winding insulating coating film beforehand disposed on said winding receiving portion is broken during attachment to said winding receiving portion to permit the winding to conductively contact the first connection fitting.

4. The motor according to claim 1 wherein said second connection fitting is constituted as a pressure contact type terminal in which an insulating coating film of the lead wire is broken by attaching the lead wire to a groove to conductively contact the second connection fitting.

5. The motor according to claim 1 wherein said terminal plate comprises a lead wire exit, and a lead wire guide groove running in the peripheral direction to guide the lead wire from said second connection fitting to the lead wire exit, and the guide groove has a width substantially equal to a diameter of the lead wire.

6. The motor according to claim 1 wherein said terminal plate has a lead wire exit, and a lead wire guide groove running in the peripheral direction to guide the lead wire from said second connection fitting to said lead wire exit, and the guide groove has a depth in which a plurality of said lead wires can be bundled and accommodated.

7. An electric motor comprising:
   a plurality of windings wound around a stator core;
   a plurality of winding terminal receiving portions, disposed on an end surface portion of said stator core at an interval in a peripheral direction, for individually receiving a plurality of winding terminal portions;
   a plurality of connection fittings which fixes said winding terminal portion to said winding terminal receiving portion and which electrically connects with said winding terminal portion on one side, said plurality of connection fittings having a groove through which a lead wire connected to said winding terminal portion passes in the peripheral direction of said stator core on the other side; and
   a terminal plate having connection fitting receiving portions to which said plurality of connection fittings are attached and which are dispersed in the peripheral direction so as to correspond to said plurality of winding terminal receiving portions,
   said connection fitting being beforehand attached to either of said winding terminal receiving portion and said terminal plate.

8. The motor according to claim 7 wherein said winding terminal portion is drawn out in a radial direction of the stator and fixed to said connection fitting.

9. The motor according to claim 7 wherein said first connection fitting is constituted as a pressure contact type terminal in which a winding insulating coating film beforehand disposed on said winding receiving portion is broken during attachment to said winding receiving portion to permit the winding to conductively contact the connection fitting.

10. The motor according to claim 7 wherein said connection fitting is constituted as a pressure contact type terminal in which an insulating coating film of the lead wire is broken by attaching the lead wire to a groove to conductively contact the connection fitting.

11. The motor according to claim 7 wherein said terminal plate comprises a lead wire exit, and a lead wire guide groove running in the peripheral direction to guide the lead wire from said second connection fitting to the lead wire exit, and the guide groove has a width substantially equal to a diameter of the lead wire.

12. The motor according to claim 7 wherein said terminal plate has a lead wire exit, and a lead wire guide groove running in the peripheral direction to guide the lead wire from said second connection fitting to said lead wire exit, and the guide groove has a depth in which a plurality of said lead wires can be bundled and accommodated.

* * * * *